May 5, 1925.
G. A. AYERS
FRUIT GATHERER
Filed June 1, 1921
1,536,554
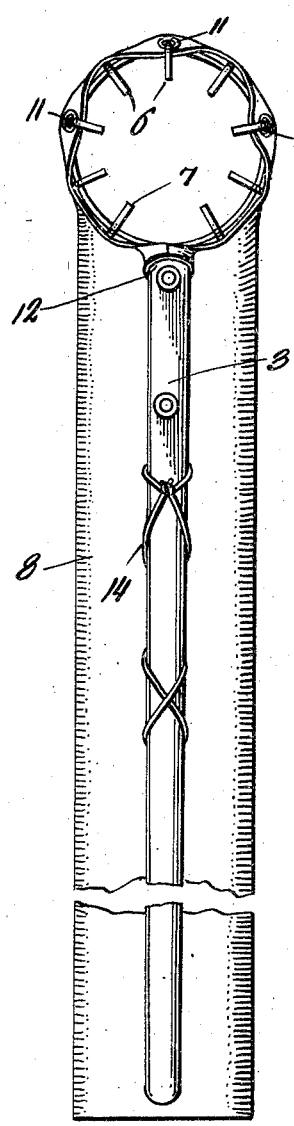
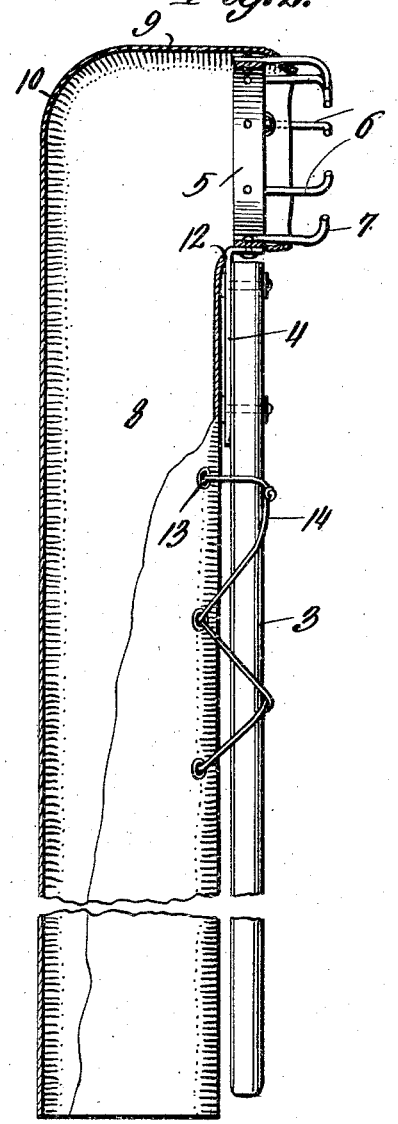
WITNESSES
GURNEY A. AYERS  INVENTOR.
BY
ATTORNEY.

Patented May 5, 1925.

1,536,554

UNITED STATES PATENT OFFICE.

GURNEY A. AYERS, OF MOUNT AIRY, NORTH CAROLINA.

FRUIT GATHERER.

Application filed June 1, 1921. Serial No. 474,223.

*To all whom it may concern:*

Be it known that I, GURNEY A. AYERS, a citizen of the United States, residing at Mount Airy, in the county of Surry and State of North Carolina, have invented certain new and useful Improvements in Fruit Gatherers, of which the following is a specification.

This invention relates to new and useful improvements in fruit pickers and gatherers, an important object of the invention being to provide means whereby fruit may be easily picked regardless of its location or the position in which the device is held for reaching the fruit.

Another important object of the invention is to provide a fruit picking device having a fruit collecting or receiving bag or receptacle provided with means whereby it can be easily attached to or detached from the picking means.

Another object of the invention is to provide simple and inexpensive means for retaining the fruit collecting bag in close proximity to the handle throughout its length.

A further object of the invention is to provide a device of the above character having a fruit collecting bag constructed in a particular manner and associated with the picking means in such a way that the bag will not interfere with the entrance of the fruit into the picking means.

A further object of the invention is to provide a device of the nature which is of exceedingly simple construction requiring no adjustments, and one which is strong, durable and inexpensive to maintain and manufacture.

Other objects and advantages of the invention will become apparent during the course of the following description.

In the accompanying drawings forming a part of the application and wherein like numerals are employed to designate like parts throughout the several views, Figure 1 is a front elevation of the invention, and Figure 2 is a side elevation of the same, parts thereof being shown in section.

Referring now more particularly to the drawings wherein for the purpose of illustration is shown the preferred embodiment of my invention, the numeral 3 designates an elongated handle having a bar secured along one side at the upper end thereof. The upper end of this bar is bent over the upper end of the handle as best seen in Figure 2, and preferably abuts the same for adding to the rigidity of the device. A hoop or ring 5 is secured to the bent over end of the bar or strap to extend in the same plane with the handle. To the periphery of the hoop 5 are secured the inner ends of the fruit picking fingers 6 which are spaced apart and extend forwardly and at substantially right angles to the plane of the hoop. The free ends 7 of the fingers are bent inwardly toward each other and are arranged in a plane approximately parallel to that of the hoop 5. A distinct advantage accrues to the arrangement of the free ends of the fingers in that fruit may be picked by pulling the fingers away from the fruit after they have been properly associated therewith. Of course, the free ends of the fruit picking fingers are spaced apart to define an opening through which the fruit is passed so that the stems of the fruit may be arranged between any pair of the fingers when the fruit is disposed within the loop.

In order to convey the picked fruit to the operator or to the ground whichever is desired, the fruit gathering or receiving bag or receptacle 8 has its mouth or upper end 9 formed to provide a lateral extension for connection with the picking means. The bag in the present instance is made of fabric and its upper end is sewed in such a manner as to provide the lateral extension referred to whereby the upper end of the bag will not sag across the hoop to interfere with the entrance of fruit therethrough. As clearly seen in Figure 2, the heel 10 of the lateral extension is caused to remain in the position shown in Fig. 2 by the particular formation of the upper end of the bag and the heavy material which is used in its construction.

The bag is rendered readily detachable from the picking means by the provision of eyelets 11 provided at the edge of the lateral extension and through which pass certain of the fruit picking fingers 6. Due to the fact that the fingers pass through these eyelets, it will be obvious that the hoop 5 will be disposed within the lateral extension of the bag so that the fruit picked will readily fall into the bag. The mouth of the bag is also provided with an opening 12 through which is adapted to pass the handle 3, so as to provide for the fastening of the relative lower portion of the mouth to the picking means.

From the construction outlined above, it will be seen that in order to detach the bag from the device, it is simply necessary to remove the fingers 6 from the eyelets 11 by slipping the mouth of the bag forwardly upon the fingers after which the handle 3 of the device is passed upwardly through the opening 12 and then through the mouth of the bag.

The receptacle or bag 8 is preferably elongated and adapted to extend along the handle 3 to terminate in a lower open end which may be closed by the operator by simply grasping the lower end of the bag. A plurality of spaced eyelets 13 are provided in the side of the bag 8 adjacent the handle for the reception of a piece of cord or twine 14 which is adapted to embrace the handle 3 for retaining the bag to the handle throughout its length. The purpose of this arrangement is to prevent branches projecting between the bag and handle during the use of the device which would render the shifting of the device from one place to another difficult.

In the use of the device, the operator holds the device by gripping the handle 3 by one hand, while with the other hand he closes the open lower end of the bag 8. The picker is then manipulated so as to cause fruit to pass into the hoop after which the handle is moved in any direction to sever the fruit. As explained before, the angular free ends of the fingers 6 make it possible to pick fruit with the device held in an upright position and even when the device is moved away from the fruit since the angular ends will engage the fruit and pull it from the tree. Further, it will be seen that the angularly disposed ends of the fingers will prevent the fruit from falling to the ground after it has been severed and will direct the fruit through the hoop 5 into the bag. As the operator holds the lower end of the bag closed, the fruit will be maintained therein until a sufficient quantity has been picked, after which the operator releases the lower end of the bag and permits the fruit to pass into larger receptacle.

The foregoing description and accompanying drawings have reference to what might be considered to be the approved or preferred form of my invention. I desire it to be understood that I may make such changes in the construction, combination and arrangement of parts material, dimensions, etc., as may prove expedient and fall within the scope of the appended claim.

Having thus described my invention what I claim as new and desire to secure by Letters Patent is:

A fruit picking device comprising an elongated handle, a flat bar secured at the upper end of the handle provided with a laterally extending supporting tongue arranged over the end of the handle, a hoop secured to said tongue disposed in the same plane as the handle, a plurality of gathering fingers secured to the hoop and extending outwardly therefrom, a gathering chute provided with a lateral extension having an opening therein for receiving the handle and a plurality of spaced eyelets for receiving certain of the gathering fingers, and inwardly directed hooks formed on the fingers for facilitating the picking of the fruit and for preventing the displacement of the chute from off of said fingers.

In testimony whereof I affix my signature in the presence of two witnesses.

GURNEY A. AYERS.

Witnesses:
J. B. HAYNES,
J. W. LORRILL.